(12) United States Patent
Ferrarese et al.

(10) Patent No.: US 8,789,561 B2
(45) Date of Patent: Jul. 29, 2014

(54) MANIFOLD FOR FLOW DISTRIBUTION

(75) Inventors: Frank A Ferrarese, West Caldwell, NJ (US); Shailesh N Khatavkar, Pune (IN); Rajesh R Salikeri, Pune (IN)

(73) Assignee: Automatic Switch Company, Florham Park, NJ (US)

( * ) Notice: Subject to any disclaimer, the term of this patent is extended or adjusted under 35 U.S.C. 154(b) by 300 days.

(21) Appl. No.: 13/495,670

(22) Filed: Jun. 13, 2012

(65) Prior Publication Data

US 2013/0333778 A1 Dec. 19, 2013

(51) Int. Cl.
*F16K 11/24* (2006.01)
*F16L 41/03* (2006.01)

(52) U.S. Cl.
USPC ........................................ 137/883; 137/561 A

(58) Field of Classification Search
USPC .............................................. 137/561 A, 883
See application file for complete search history.

(56) References Cited

U.S. PATENT DOCUMENTS

| | | | |
|---|---|---|---|
| 1,978,015 A * | 10/1934 | Erdman | 134/24 |
| 2,037,994 A * | 4/1936 | Neubauer | 137/266 |
| 2,669,482 A | 2/1954 | Gold et al. | |
| 2,986,335 A | 5/1961 | Turnquist | |
| 4,027,699 A | 6/1977 | Andersson | |
| 4,537,217 A * | 8/1985 | Allen, Jr. | 137/561 A |
| 4,580,597 A * | 4/1986 | Cordingley et al. | 137/561 A |
| 4,614,202 A | 9/1986 | Halvorsen | |
| 5,941,074 A | 8/1999 | Schultz | |
| 5,950,575 A * | 9/1999 | Simons et al. | 122/511 |
| 6,110,440 A * | 8/2000 | Ohta et al. | 423/351 |
| 6,189,321 B1 | 2/2001 | Banhardt et al. | |
| 8,544,498 B2 * | 10/2013 | Petersen et al. | 137/561 A |
| 8,656,990 B2 * | 2/2014 | Kajaria et al. | 166/177.5 |

FOREIGN PATENT DOCUMENTS

GB 2 323 428 9/1998

OTHER PUBLICATIONS

Gebker, U., International Search Report from International Patent Application No. PCT/US2013/030903, dated Jul. 15, 2013, European Patent Office.
Gebker, U., Written Opinion from International Patent Application No. PCT/US2013/030903, dated Jul. 15, 2013, European Patent Office.

\* cited by examiner

*Primary Examiner* — John Fox
(74) *Attorney, Agent, or Firm* — Sutton McAughan Deaver, PLLC

(57) ABSTRACT

A manifold (100) comprising an inlet port (102) for receiving a fluid flow, said inlet port defining a flow passage (122); a plurality of outlet ports (104-114); wherein some of the outlet ports are provided with direct communication with said flow passage (122); and the ports being connected by auxiliary passages adapted to convey fluid between said outlet ports to reduce stagnation pressure zones and maintain desired pressure distribution at each outlet port.

16 Claims, 5 Drawing Sheets

MANIFOLD FOR FLOW DISTRIBUTION

FIELD OF DISCLOSURE

The present disclosure relates to a manifold.

Particularly, the disclosure relates to a manifold for uniform flow distribution.

BACKGROUND

Fuel manifolds for turbine engines, valves, compressors, electric motors, thermostats, regulators or gearbox are required to distribute fuel from a common distributor or manifold to a plurality of inlet nozzles or fuel injectors. The fuel distribution must be uniform to the different fuel injectors so that uniform fuel combustion is attained and temperature differentials are avoided. Also, the fuel distribution must be effectible over a wide range of operating conditions, thereby allowing considerable variations in the fuel flow rates. The fluid flow demand may be relatively small and essentially equal at the plurality of fuel injectors during some phases of operation, but is much larger and possibly unevenly distributed during other phases of the operation. For example, in the fuel supply system of a gas turbine the fuel nozzles require small and equal fuel flow when the device is starting-up and much larger fuel flows when the turbine reaches its operating speed. Therefore, when a large number of fuel injectors are used equalization of flow and variable fuel flow rates may be difficult to achieve. Further, it is also necessary that the pressure loss in each of the fuel injector line is substantially uniform with respect to each other over the entire operating range to avoid unequal fuel distribution and as low as possible for maximum fuel distribution efficiency.

These design considerations have been some what met over the years by providing rather complicated and expensive flow distribution means and fuel metering valves. U.S. Pat. No. 4,614,202 is a typical example of a prior art device in which a fuel flow distribution valve including a valve body having a bore with a spring biased pressure responsive valve is disclosed. The valve housing, which is in communication with a housing inlet, is provided with a plurality of integrally formed discharge ports, wherein these numerous discharge ports are provided on either side of the valve. U.S. Pat. No. 4,027,699 is another typical example of a prior art device in which a fluid distribution valve having a single inlet and a plurality of parallel outlets for connection of a plurality of fluid demand locations is disclosed. The valve body receives a fluid through an inlet into a manifold chamber having a plurality of parallel openings which are always open. The valve body further comprises pistons adapted to close outlet ports which are provided in operative communication with the plurality of openings. U.S. Pat. No. 2,986,335 is yet another typical example of a prior art device in which a turbojet engine fuel distribution system for equal distribution of fully atomized fuel throughout an extreme range of operating conditions is disclosed. The system utilizes the good low flow metering characteristics of variable area fuel nozzles in combination with fixed area orifices and other proven components to overcome the poor flow dividing and metering characteristics of variable area nozzles at higher fuel flows.

These devices are complicated, expensive and difficult to operate There is therefore felt a need for a simple fluid distribution manifold which is capable of providing uniform fluid distribution over the entire operating range while maintaining uniform pressure at each of the outlet port.

OBJECTS

Some of the objects of the present disclosure which at least one embodiment is adapted to provide, are described herein below:

It is an object of the present disclosure is to ameliorate one or more problems of the prior art or to at least provide a useful alternative.

An object of the present disclosure is to provide an improved manifold for uniform fluid flow distribution which reduces stagnation pressure zone, reduces envelope size, and helps maintain uniform pressure distribution at each outlet port.

Another object of the present disclosure is to provide a manifold for uniform fluid flow distribution which has a simple compact construction with minimal parts and is inexpensive to implement, efficient in operating and reliable over a long service life.

Still another object of the present disclosure is to provide a manifold which gives equal flow distribution irrespective of the inlet pressure.

One more object of the present disclosure is to provide a manifold for turbine engines, electric motors, compressors, valves, thermostats, regulators, gearboxes and the like.

Other objects and advantages of the present disclosure will be more apparent from the following description when read in conjunction with the accompanying figures, which are not intended to limit the scope of the present disclosure.

SUMMARY

A manifold (100) is disclosed in accordance with an embodiment. The manifold (100) includes an inlet port (102), a plurality of outlet ports (104, 106, 108, 110, 112 and 114). The inlet port (102) receives a fluid flow. The inlet port (102) defines a flow passage for traversing the fluid. The plurality of outlet ports (104, 106, 108, 110, 112 and 114) are positioned in linear sets on either side of said flow passage for discharging the fluid flow. Some of the plurality of outlet ports (108, 110, 112 and 114) in each set are provided with direct operative communication with the flow passage (122) by means of apertures (124, 126) for receiving the fluid flow. The ports in each set of outlet ports on either side of the flow channel are operatively connected by auxiliary passages (128). The auxiliary passages convey fluid between the outlet ports to reduce the stagnation pressure zone and maintain a desired pressure distribution at each outlet port.

Typically, each set of outlet ports consists of three outlet ports on each side of the flow passage (122).

Generally, the outlet ports (104, 106) nearest to the inlet port (102) are not in direct operative communication with the flow passage (122).

Typically, the outlet ports (108, 110) are in direct operative communication with the flow passage (122) by means of a first aperture (124).

Generally, the outlet ports (112, 114) are in direct operative communication with the flow passage (122) by means of a second aperture (126).

Typically, a solenoid valve is provided at selective outlet ports (104, 106, 112 and 114) to close the outlet ports.

Specifically, the flow variation in the outlet ports is less than 5%.

Preferably, the inlet port (102) is smaller than dimension of said flow passage (122).

Further, in accordance with an embodiment, the ratio of the cross-sectional area of said inlet port to the cross-sectional area of said outlet port is between 1:1.7-1:23.

Typically, the ratio of the cross-sectional area of the flow passage to the cross-sectional area of said first aperture is between 1:0.3-1:0.6.

Typically, in accordance with the present disclosure, the ratio of the cross sectional area of the first aperture to the cross-sectional area of the auxiliary passage is between 1:0.2-1:0.4.

Generally, the ratio of the cross-sectional area of the first aperture to the cross-sectional area of the second aperture is between 1:1.6-1:1.9.

In accordance with an embodiment, the auxiliary passages are parallel to the flow passage.

In accordance with another embodiment, the auxiliary passages are not parallel to said flow passage.

Further, in accordance with still another embodiment, the auxiliary passages are stepped.

BRIEF DESCRIPTION OF THE ACCOMPANYING DRAWINGS

The disclosure will now be described with the help of the accompanying drawings, in which, FIG. 1 illustrates a schematic of a conventional manifold device;

DETAILED DESCRIPTION OF THE ACCOMPANYING DRAWINGS

The disclosure will now be described with reference to the accompanying drawings which only exemplify the disclosure and in no way limit its scope and ambit. The description provided is purely by way of example and illustration.

The embodiments herein and the various features and advantageous details thereof are explained with reference to the non-limiting embodiments in the following description. Descriptions of well-known components and processing techniques are on so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the an will recognize that the embodiments herein can be practiced with modification within the spirit and scope of the embodiments as described herein.

Figure 1:
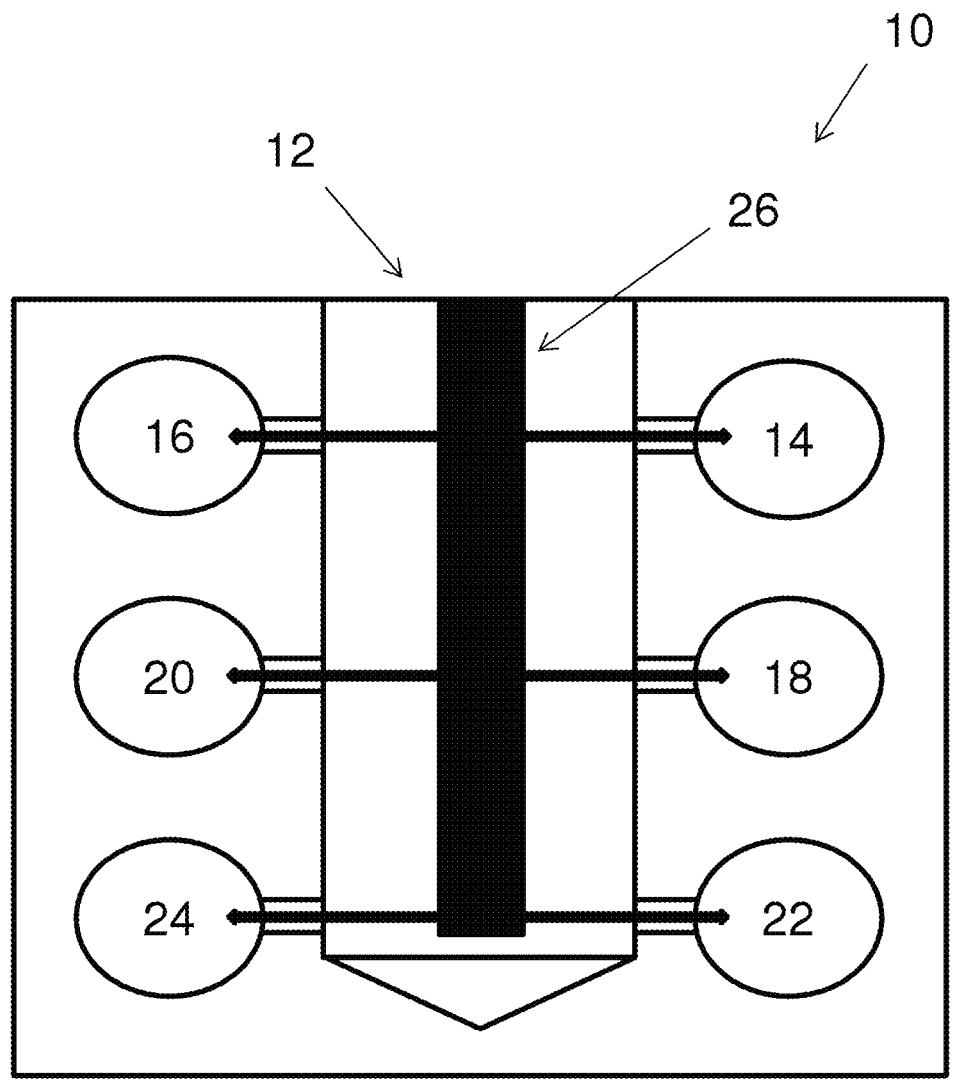
Figure 5:
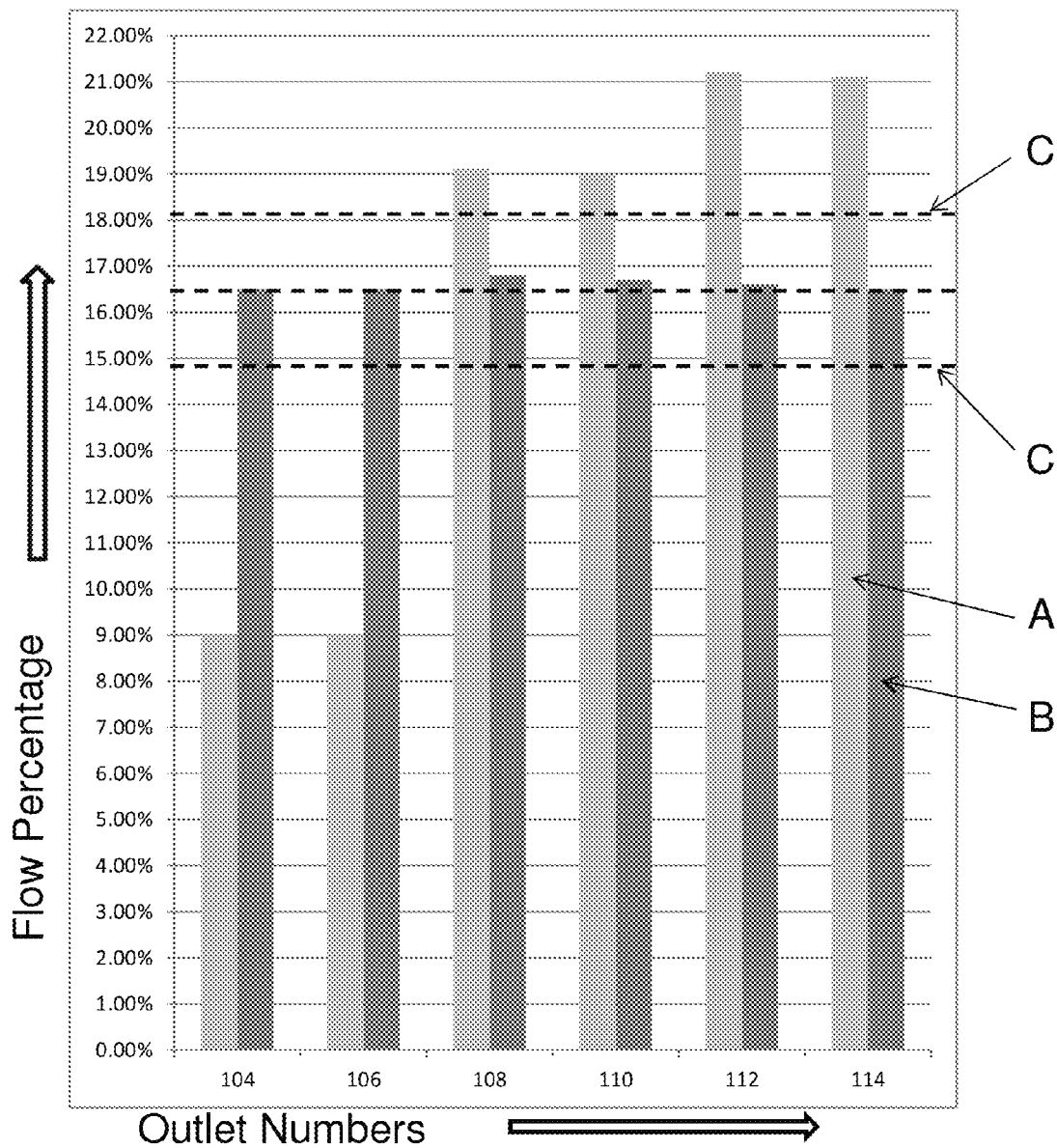
FIG. 5 illustrates a graphical representation showing the flow distribution through each outlet port comparing the conventional manifold of FIG. 1 and the manifold in accordance with the present disclosure.

In FIG. 1, there is illustrated a conventional manifold device 10 having an inlet port 12 and plurality of outlet ports (14, 16, 18, 20, 22 & 24). The inlet port 12 defines a flow passage 26 for conveying a fluid. The outlet ports (14, 16, 18, 20, 22 & 24) are located on either sides of the flow passage 26, with three outlet ports linearly arranged on each side of the flow passage 26. Each of the outlet port (14, 16, 18, 20, 22 & 24) is directly connected to the how passage 26 to receive the fluid flow coming in through the inlet port 12, This causes stagnation pressure at the outlet ports (22 & 24). The flow path of the fluid in the manifold in illustrated in the FIG. 1. FIG. 5 shows the graphical representation of the percentage flow rate (A) through each outlet. It is seen that by using the conventional manifold device 10 a substantial flow variation is obtained between outlet ports (14 & 16), outlet ports (18 & 20) and outlet ports (22 & 24). The flow variation between these outlet ports in greater than 125% when all the ports are operational. The present disclosure aims at overcoming these drawbacks of the conventional manifold device 10.

The present disclosure envisages a manifold having a simple compact construction which provides uniform flow distribution and uniform pressure distribution at each of the outlet port. This manifold is suitable for use in turbines, electric motors, compressors, thermostats, valves, regulators, gearboxes, and any such device that demands uniform flow distribution of a fuel/fluid from a common inlet to multiple outlets.

Figure 2:
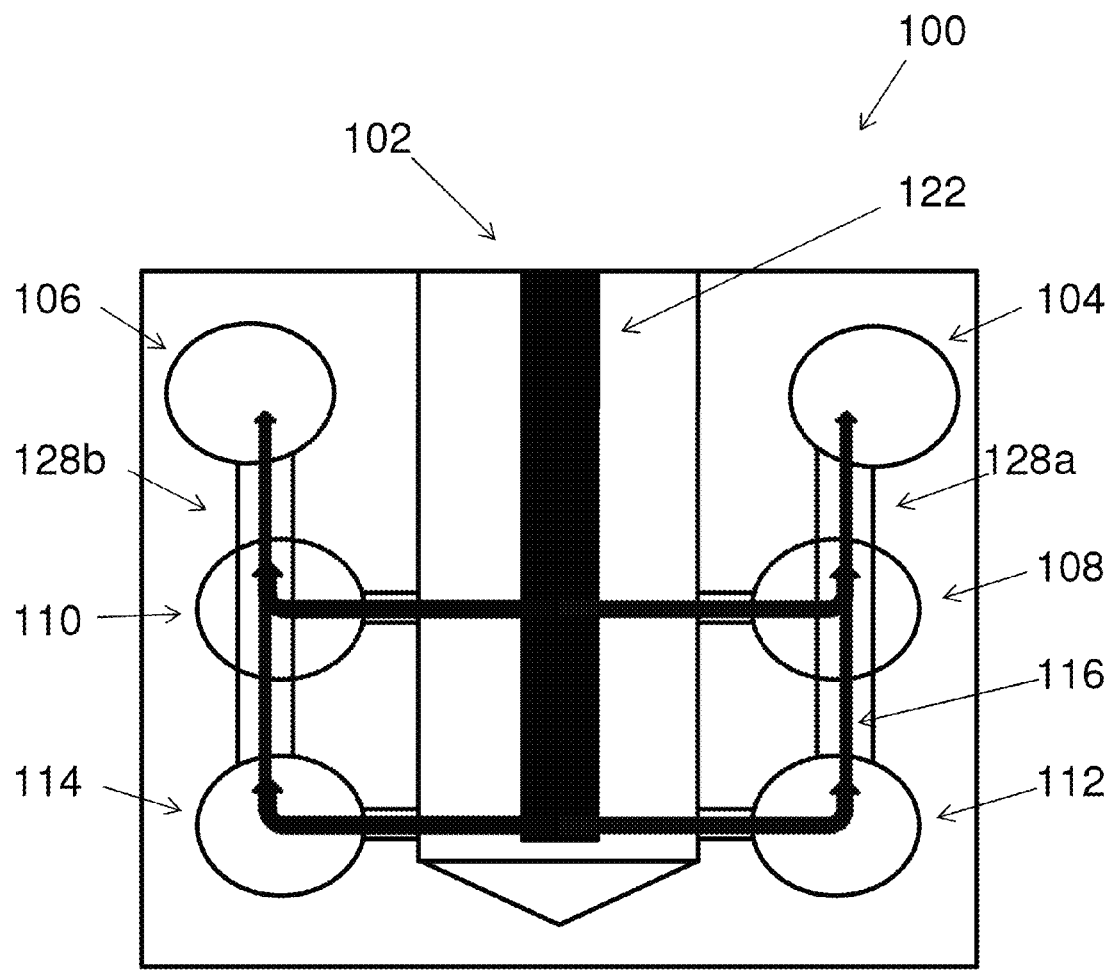
FIG. 2 illustrates a schematic of the preferred embodiment of the manifold showing the fluid flow path in accordance with the present disclosure.
Figure 3:
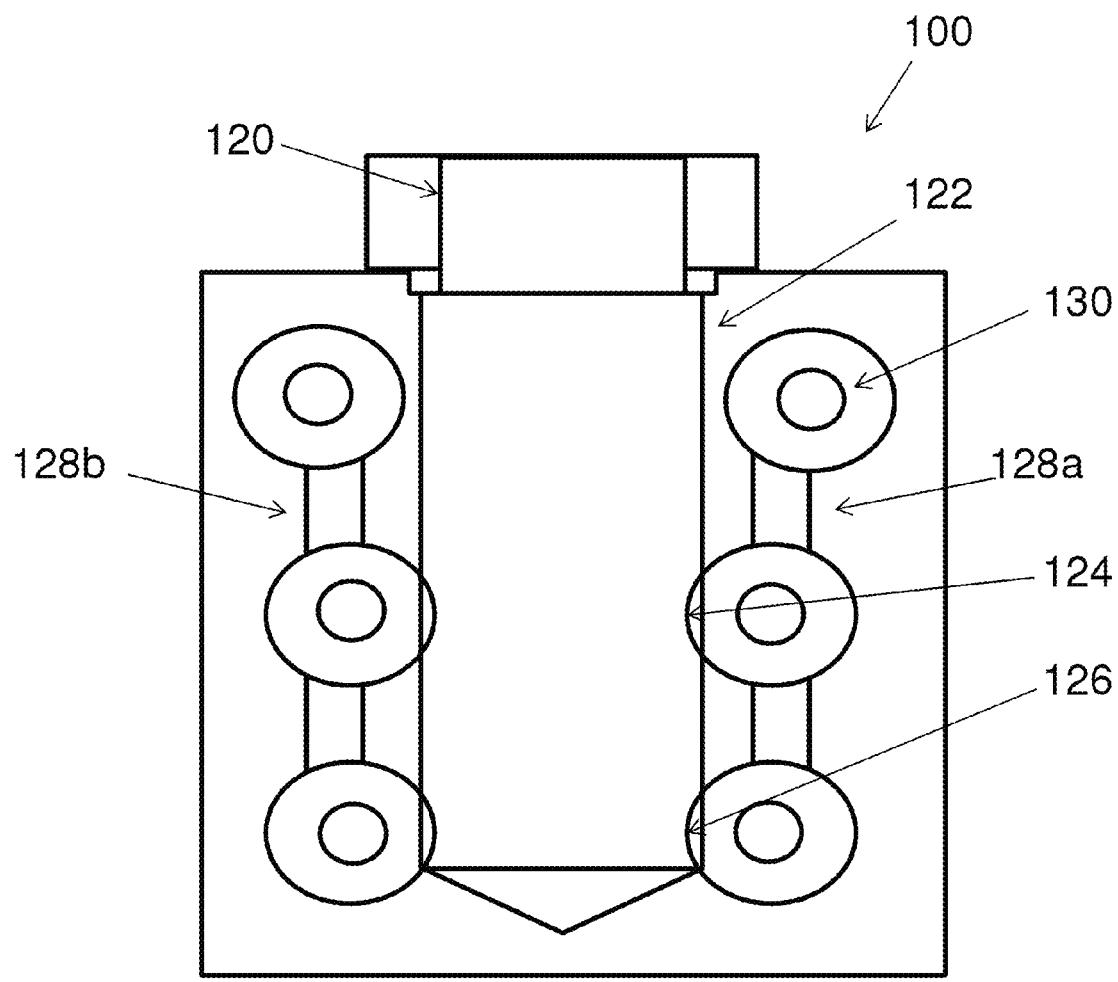
FIG. 3 illustrates a schematic of the preferred embodiment of the manifold showing the apertures and the auxiliary passage in accordance with the present disclosure.
Figure 4A:
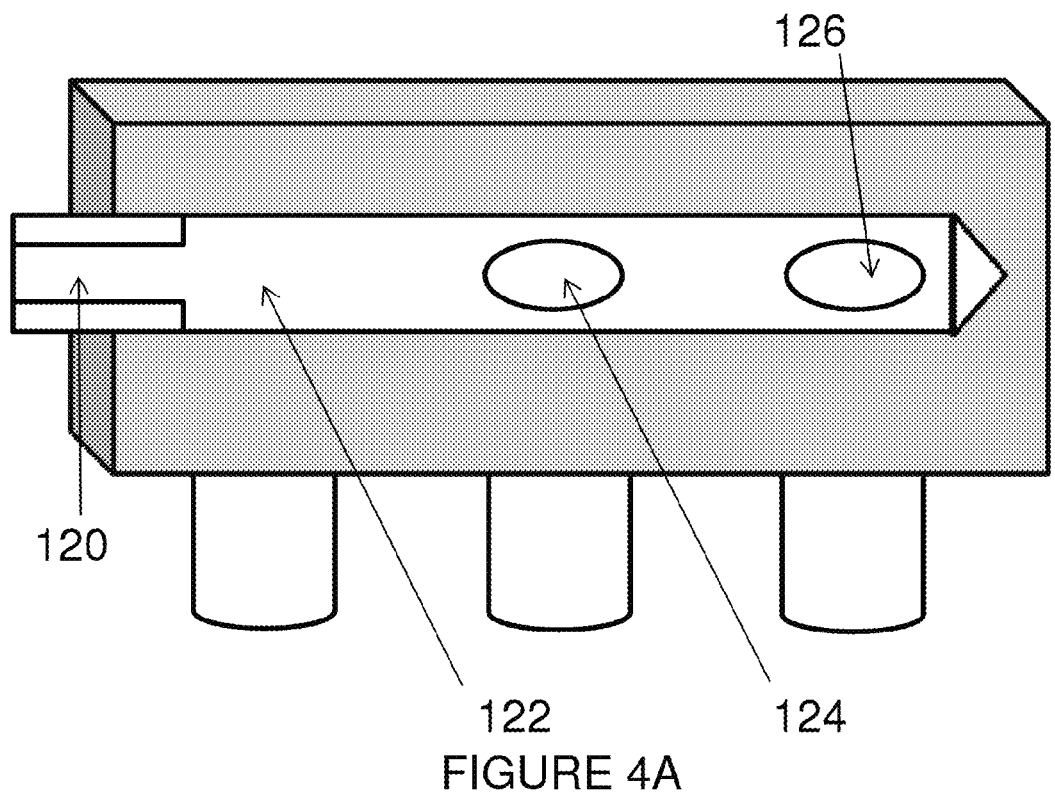
FIG. 4a illustrates a pictorial view of the manifold showing the inlet port, the flow passage and the apertures in accordance with the present disclosure.

In FIGS. 2-4, there is illustrated a preferred embodiment of the manifold 100 in accordance with the present disclosure. The manifold 100 has a box-like structure comprising an inlet port 102 for receiving a fluid flow. The inlet port 102 defines a flow passage 122 for traversing the fluid in the manifold 100. Six outlet ports (104, 106, 108, 110, 112 & 114), with three outlet ports positioned linearly on either side of the flow passage 122, are provided for discharging the fluid orthogonal to its entry. The flow path of the fluid in the manifold is illustrated by arrows in FIG. 2. This flow path is achieved by directly connecting some of the outlet ports, viz. outlet ports 108, 110, 112 & 114, to the flow passage 122 by means of apertures (124 & 126) shown in FIGS. 3 and 4a. The outlet ports nearest to the inlet port 102, viz. outlet ports 104 & 106 are not directly connected to the flow passage 122. The fluid entering at the inlet port 102 first enters the outlet ports through the apertures (124 & 126).

An auxiliary passage 128 is provided for connecting the outlet ports on each side of the flow passage, The auxiliary passage 128 may or may not be parallel to the flow passage 122. Also, the auxiliary passage may be stepped. A first auxiliary passage 128a connects the outlet ports 104, 108 & 112, while a second auxiliary passage 128b connects the outlet ports 106, 110 & 114. The fluid entering at the inlet port 102 is conveyed through the flow passage 122. The fluid first enters the apertures (124 & 126) at the outlet ports (108, 110, 112 & 114) and is then conveyed to the outlet ports (104 & 106) via the auxiliary passage 128. The outlet ports (108 & 110) are in direct communication with the flow passage 122 through a first aperture 124 and the outlet ports (112 & 114) are in direct communication with the flow passage 122 through a second aperture 126, FIG. 5 shows a graphical representation of the percentage flow rate (B) through each of the outlet ports (104, 106, 108, 110, 112 & 114) using the manifold 100. It was observed that an equal flow distribution is achieved at each of the outlet ports when all the outlet ports are operational. When all the six outlet ports (104, 106, 108, 110, 112 & 114) were operational, an ideal flow rate of 16.67% was achieved at each of the outlet port, well within the permissible flow variation range (C) of ±1.67% (10%). The flow variation achieved by using the manifold 100 is less than 5% at each of the outlet port.

In a preferred embodiment of the present disclosure, electrically actuated solenoid valves (not shown in figures) are provided at selective outlet ports, viz, 104, 106, 112 & 114. The outlet ports 108 & 110 are always open while the remaining outlet ports (104, 106, 112 & 114) can be selectively shut-off. The valves are optional and may or may not be used.

Figure 4B:
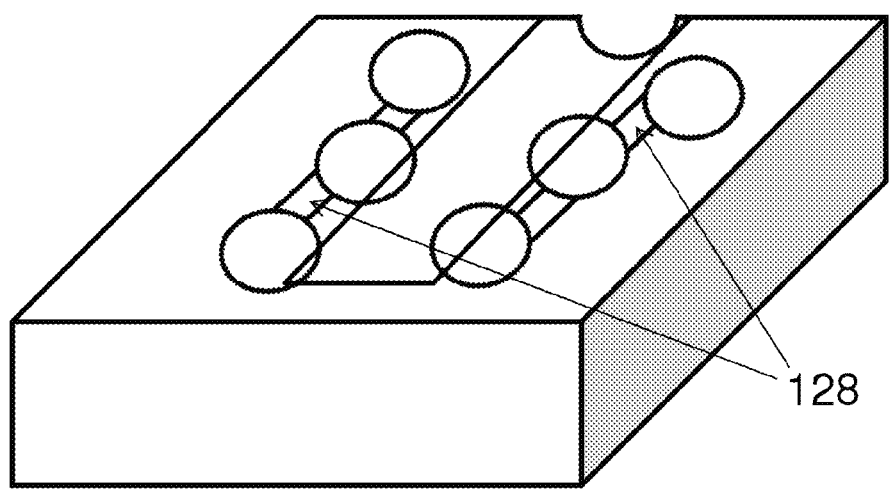
FIG. 4b illustrates a pictorial view of the manifold showing the apertures and the auxiliary passage in accordance with the present disclosure.

The dimension of the inlet port 102 is smaller than the dimension of the flow passage 122. This helps in reducing the overall manifold envelope size. Preferably, cross-sectional area of the inlet port 102 is 20% less than the cross sectional area of the flow passage 122. FIG. 3 illustrates the manifold 100 showing the arrangement and relative cross sectional area of the inlet, port 102, the flow passage 122, the outlet ports (104, 106, 108, 110. 112 & 114), the auxiliary passage 128 and the apertures (124 & 126). In a preferred embodiment of the present disclosure, the ratio of the cross sectional area 120 of the inlet port 102 to the cross sectional area 130 of the outlet ports (104, 106, 108, 110, 112 & 114) is between 1: 1.7-1:23, preferably 1:2. The ratio of the cross sectional area of the flow passage 122 to the cross sectional area of the first aperture 124 is between 1:0.3-1:0.6, preferably 1:0.45. The ratio of the cross sectional area of the first aperture 124 to the cross sectional area of the auxiliary passage 128 is between 1:0.2-1: 0.4, preferably 1:0.3. The ratio of the cross sectional area of the first aperture 124 to the cross sectional area of the second, aperture 126 is between 1:1.6-1:1.9, preferably 1:1.75. FIG. 4a illustrates a pictorial view of the manifold 100 showing the cross sectional area 120 of the inlet port 102, cross sectional area of the flow passage 122, and cross sectional areas of the first aperture 124 and second aperture 126. FIG. 4b illustrates a pictorial view of the manifold 100 showing the cross sectional area of the auxiliary passage 128.

The manifold 100 of the present disclosure provides a flow variation of less than 5% (shown in FIG. 5) at each of the operational outlet port. The flow variation may increase up to 20% under the following conditions: the outlet ports are opened in random combinations through the use of solenoid valves, for e.g. when outlet ports 106, 108 and 112 are opened or outlet ports 108 & 110 are open; on increasing the cross sectional area 120 of the inlet port 102 or cross sectional area of the flow passage 122; on changing the fluid media.

Technical Advantages

A manifold for uniform fluid flow distribution, as described in the present disclosure has several technical advantages including but not limited to the realization of: reduction in stagnation pressure zone, reduction in overall manifold envelope size, and provides uniform pressure distribution at each outlet port; has a simple compact construction with minimal parts and is inexpensive to implement, efficient in operating and reliable over a long service life; equal flow distribution irrespective of the inlet pressure; and is suitable for turbine engines, electric motors, compressors, valves, thermostats, regulators, gearboxes and the like.

Throughout this specification the word "comprise", or variations such as "comprises" or "comprising", will be understood to imply the inclusion of a stated element, integer or step, or group of elements, integers or steps, but not the exclusion integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this, specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Wherever a range of values is specified, a value up to 10% below and above the lowest and highest numerical value respectively, of the specified range, is included in the scope of the disclosure.

In view of the wide variety of embodiments to which the principles of the present disclosure can be applied, it should he understood that the illustrated embodiments are exemplary only. While considerable emphasis has been placed herein on the particular features of this disclosure, it will he appreciated that various modifications can be made, and that may changes can be made in the preferred embodiments without departing from the principle of the disclosure. These and other modifications in the nature of the disclosure or the preferred embodiments will be apparent to those skilled in the art from the disclosure herein, whereby it is to be distinctly understood that the foregoing descriptive matter is to he interpreted merely as illustrative of the disclosure and not as a limitation.

The invention claimed is:

1. A manifold (100) comprising:
an inlet port (102) for receiving a fluid flow, said inlet port defining a flow passage (122) for traversing the fluid;
a plurality of outlet ports (104, 106, 108, 110, 112 and 114) positioned in linear sets on either side of said flow passage for discharging the fluid flow;
wherein, some of said plurality of outlet ports (108, 110, 112 and 114) in each set are provided with direct operative communication with said flow passage (122) by means of apertures (124, 126) adapted to receive the fluid flow; and
the ports in each set of outlet ports on either side of said flow channel are operatively connected by auxiliary passages (128), said auxiliary passages being adapted to convey fluid between said outlet ports to reduce the stagnation pressure zone and maintain a desired pressure distribution at each outlet port.

2. The manifold as claimed in claim 1, wherein each set of outlet ports consists of three outlet ports on each side of said flow passage (122).

3. The manifold as claimed in claim 2, wherein outlet ports (104, 106) nearest to said inlet port (102) are not in direct operative communication with said flow passage (122).

4. The manifold as claimed in claim 2, wherein outlet ports (108, 110) are in direct operative communication with said flow passage (122) by means of a first aperture (124).

5. The manifold as claimed in claim 4, wherein ratio of the cross-sectional area of said flow passage (122) to the cross sectional area of said first aperture (124) is between 1:0.3-1:0.6.

6. The manifold as claimed in claim 4, wherein ratio of the cross-sectional area of said first aperture (124) to the cross-sectional area of said auxiliary passage (128) is between 1:0.2-1:0.4.

7. The manifold as claimed in 4, wherein ratio of the cross-sectional area of said first aperture (124) to the cross-sectional area of said second aperture (126) is between 1:1.6-1:1.9.

8. The manifold as claimed in claim 2, wherein outlet ports (112, 114) are in direct operative communication with said flow passage (122) by means of a second aperture (126).

9. The manifold as claimed in claim 5, wherein ratio of the cross-sectional area of said first aperture (124) to the cross-sectional area of said second aperture (126) is between 1:1.6-1:1.9.

10. The manifold as claimed in claim 1, wherein a solenoid valve is provided at selective outlet ports (104, 106, 112 & 114) to close said outlet ports.

11. The manifold as claimed in claim 1, wherein the flow variation in the outlet ports is less than 5%.

12. The manifold as claimed in claim 1, wherein dimension of said inlet port (102) is smaller than dimension of said flow passage (122).

13. The manifold as claimed in claim 1, wherein ratio of the cross-sectional area area of said inlet port (102) to the cross-sectional area of said outlet ports (104, 106, 108, 110, 112 & 114) is between 1:1.7-1:2.3.

14. The manifold as claimed in claim 1, wherein said auxiliary passages (128) are parallel to said flow passage (122).

15. The manifold as claimed in claim 1, wherein said auxiliary passage (128) are not parallel to said flow passage (122).

16. The manifold as claimed in claim 1, wherein said auxiliary passage (128) is stepped.

* * * * *